United States Patent
Marmah et al.

(10) Patent No.: US 7,475,889 B2
(45) Date of Patent: Jan. 13, 2009

(54) LOUNGE CHAIRS AND COOLER COMBINATION

(76) Inventors: Harriet Arnett Marmah, 5259 S. Montecito Dr., Concord, CA (US) 94521; Abu Marmah, 5259 S. Montecito Dr., Concord, CA (US) 94521

(*) Notice: Subject to any disclaimer, the term of this patent is extended or adjusted under 35 U.S.C. 154(b) by 380 days.

(21) Appl. No.: 11/449,452

(22) Filed: Jun. 8, 2006

(65) Prior Publication Data
US 2006/0279052 A1 Dec. 14, 2006

Related U.S. Application Data

(60) Provisional application No. 60/689,037, filed on Jun. 10, 2005.

(51) Int. Cl.
*B62B 1/12* (2006.01)
(52) U.S. Cl. ................ 280/47.26; 280/30; 297/129; 297/188.1
(58) Field of Classification Search ........... 280/648, 280/650, 654, 30, 47.18, 47.26, 47.4; 297/188.1, 297/188.08, 188.09, 188.11, 188.15, 129, 297/144
See application file for complete search history.

(56) References Cited

U.S. PATENT DOCUMENTS

| | | | | |
|---|---|---|---|---|
| 3,230,006 A * | 1/1966 | Sokolis | ................ | 297/188.1 |
| 3,290,089 A * | 12/1966 | Farrell | ................ | 297/39 |
| 3,930,662 A * | 1/1976 | Manner | ................ | 280/648 |
| 4,865,346 A * | 9/1989 | Carlile | ................ | 280/654 |
| 6,000,752 A * | 12/1999 | Shyr | ................ | 297/188.08 |
| 6,773,059 B2 * | 8/2004 | Volotsenko | ................ | 297/129 |
| 6,883,267 B1 * | 4/2005 | Pruitt | ................ | 43/54.1 |
| 7,163,262 B2 * | 1/2007 | Anglin | ................ | 297/217.1 |
| 7,309,106 B2 * | 12/2007 | Stallman | ................ | 297/310 |

* cited by examiner

*Primary Examiner*—Christopher Ellis
*Assistant Examiner*—Bridget Avery

(57) ABSTRACT

A combination of two folding lounge chairs and a cooler which, in a folded form, acts as a compact lightweight unit for ease of portability. The chairs are folded and connected to the back of the cooler and interlocked with each other to form a compact unit until ready for sitting. In the folded position, the chair frames act as handles for pulling the cooler, which rolls along on a set of wheels. In the expanded position the two chairs swing out on hinges from the back of the cooler, one unfolding to the right side and the other unfolding to the left side in a sitting position. The entire combination of chairs and cooler is constructed of strong but lightweight materials so that the entire assembly, when folded, forms a compact, portable unit that can be easily rolled on wheels by one person.

11 Claims, 8 Drawing Sheets

Section AA

Front view

Section BB

Side view front view side view

# LOUNGE CHAIRS AND COOLER COMBINATION

RELATED APPLICATIONS

This application claims the benefit of U.S. Provisional Application 60/689,037 filed on Jun. 10, 2005.

REFERENCES
U.S. Patent Documents:

| | | |
|---|---|---|
| 4191420 | March 1980 | Fassett et al. |
| 4470630 | September 1984 | Shields |
| 4514009 | April 1985 | Vanderminden et al. |
| 4773708 | September 1988 | Nastu |
| 4784436 | November 1988 | Sutherland |
| 4890882 | January 1990 | Harrington |
| 5318342 | June 1994 | Hale |
| 5350215 | September 1994 | DeMars |
| 5409291 | April 1995 | Lamb, et al. |
| 5435643 | July 1995 | Kennedy |
| 5628544 | May 1997 | Goodman, et al |
| 6145716 | November 2000 | Caicedo. |
| 6264078 | July 2001 | Bilang |

STATEMENT REGARDING FEDERALLY SPONSORED RESEARCH OR DEVELOPMENT

Not Applicable.

BACKGROUND OF THE INVENTION

Lounge chairs and coolers are among the most commonly used pieces of equipment for recreational purposes on beaches, parks, campgrounds, outdoor arenas and around swimming pools. Lounge chairs, even foldable ones, tend to be bulky, and not always portable. Portable coolers are also bulky and always seem to compete for space with lounge chairs and other equipment when being transported to a recreation site. Bulky chairs and coolers also tend to block the view of audiences at outdoor concerts and, for this reason, outdoor arenas often limit the size of folding chairs and coolers that people may bring to outdoor concerts.

The invention addresses the need for a lightweight, durable, fully integrated combination of lounge chairs and cooler which could be stored together in a relatively small space and transported effortlessly by one person in a portable package.

SUMMARY OF THE INVENTION

The purpose of the invention is to combine portable folding lounge chairs with a cooler to form an integrated unit that rolls on wheels and can easily be pulled by one person to beaches, parks, pool sides and other recreational sites.

The invention is a combination of two folding lounge chairs and a cooler which, in a collapsed form, acts as a compact lightweight unit for ease of portability. The chairs are folded and connected to the back of the cooler and interlocked with each other to form a compact unit until ready for sitting. In the collapsed position, the chair frames act as handles for pulling the cooler, which rolls along on a set of wheels. In the expanded position the two chairs swing out from the back of the cooler on hinges, one unfolding to the right side and the other unfolding to the left side in a sitting position. The chairs and cooler remain connected in this expanded position, but each may be adjusted independently in height as required to fit the contours of the ground or floor on which the whole unit rests. The entire combination of chairs and cooler is constructed of strong but lightweight materials so that the entire assembly, when collapsed, forms a compact, portable unit that can be easily rolled on wheels by one person.

DETAILED DESCRIPTION OF THE INVENTION

Figure 1:
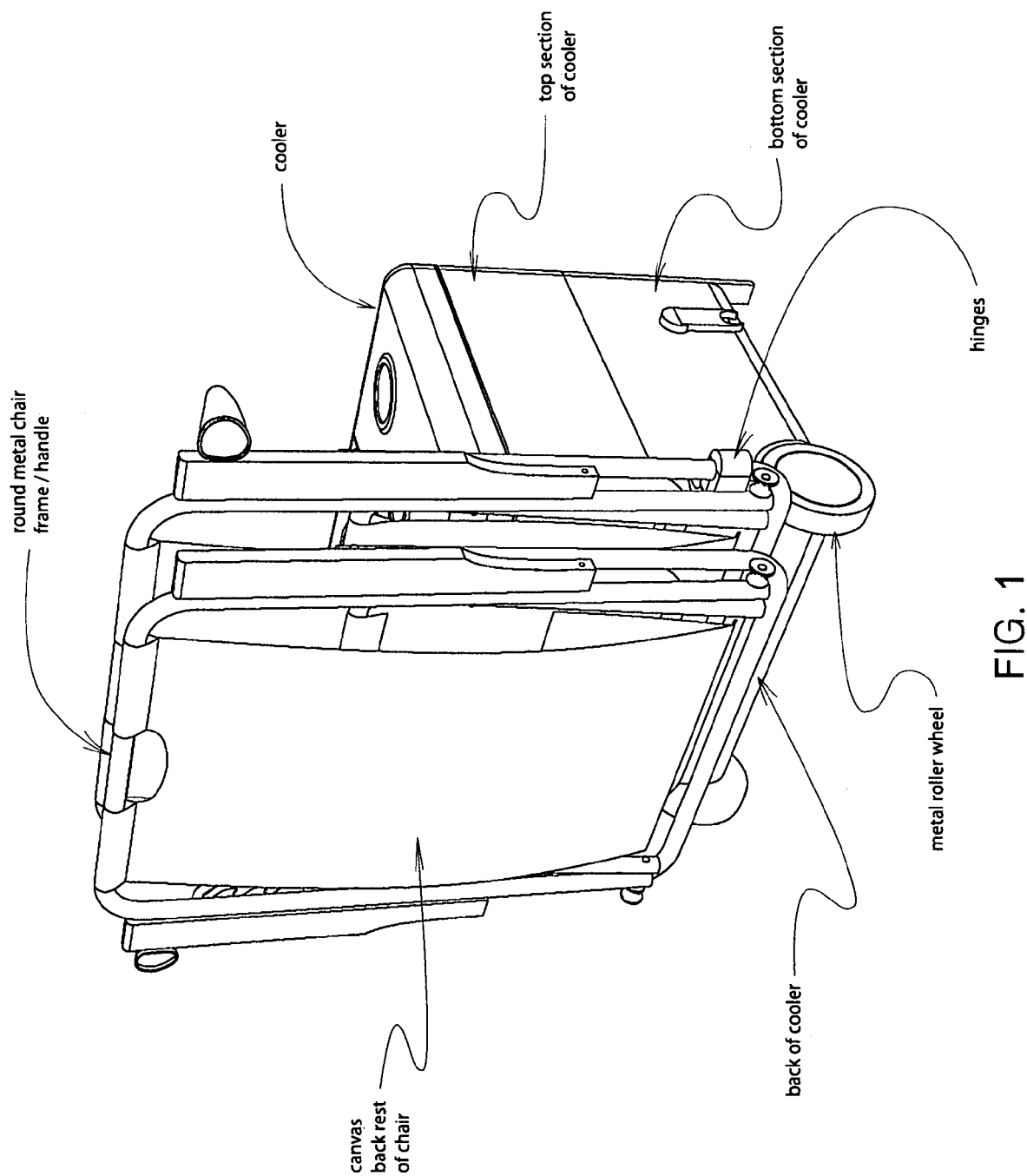
FIG. 1 is a perspective view of the lounge chairs and cooler combination in folded position for transport.

FIG. 1 shows the combination of lounge chairs and cooler in a retracted position for transport. As shown the unit consists of two folding chairs in a retracted position secured to the back of a cooler supported on two wheels in the back and two legs in the front. When in the transport position, the entire unit is about the size and shape of a small carry-on piece of luggage on wheels typically used by air travelers.

Figure 2:
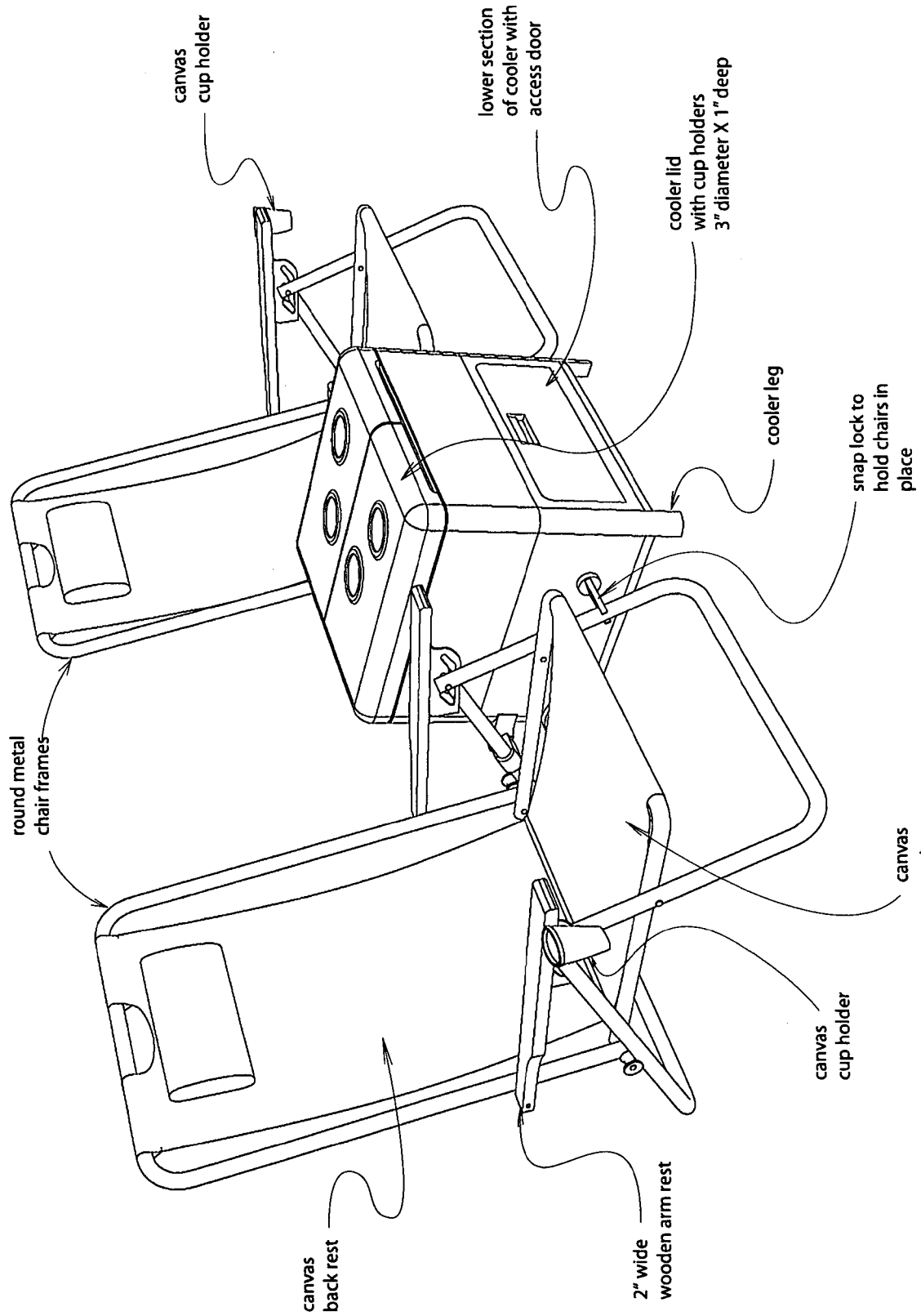
FIG. 2 is a perspective view of the lounge chairs and cooler combination in a fully deployed state ready for use.
Figure 3:
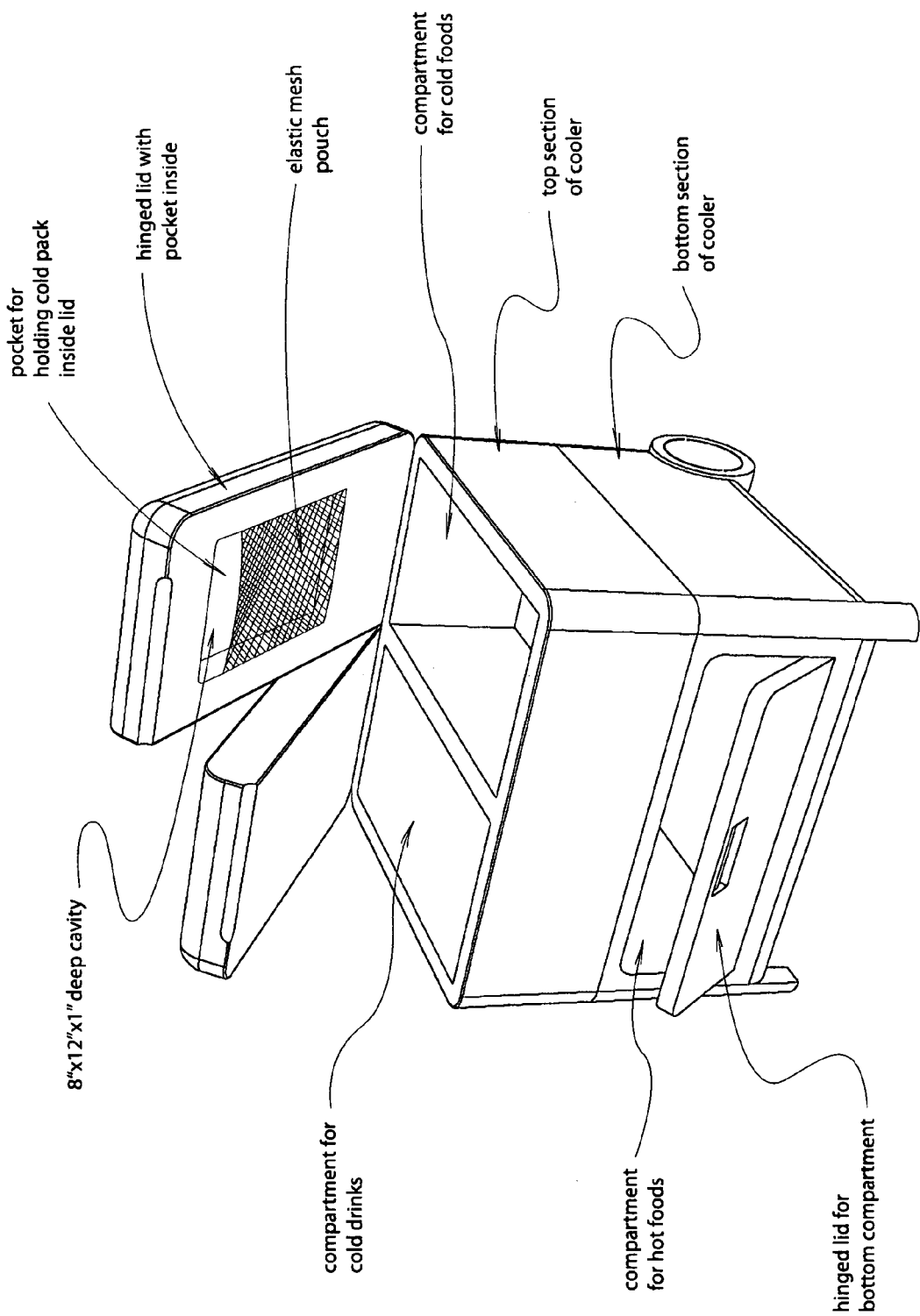
FIG. 3 is a perspective view of the cooler with the top and bottom lids open.
Figure 5:
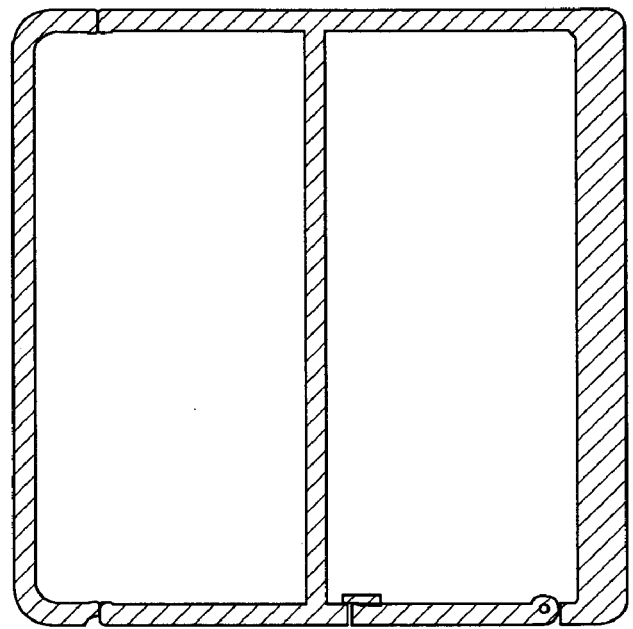
FIG. 5 is a cross-sectional view of the cooler taken along line A-A of FIG. 3.
Figure 4:
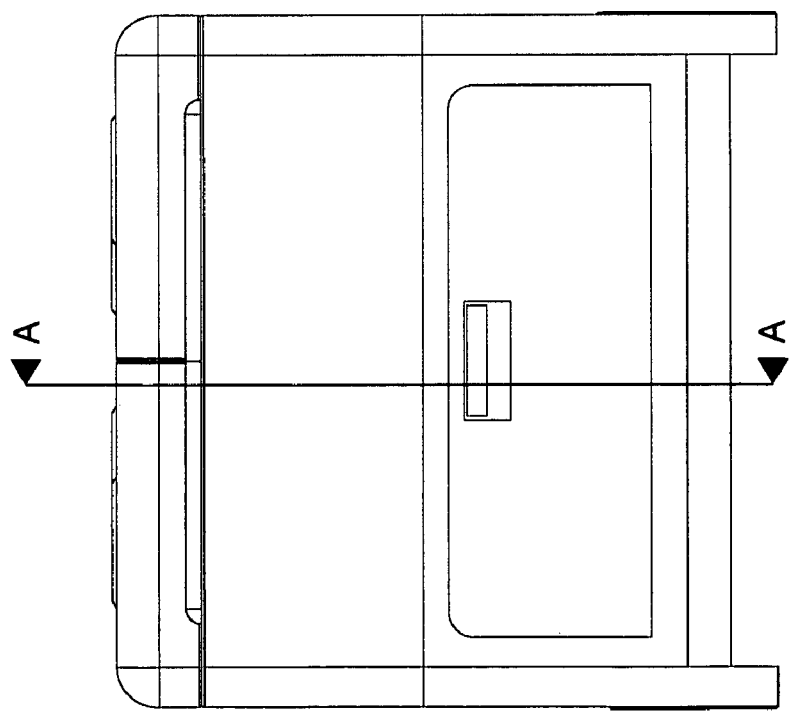
FIG. 4 is a front view of the cooler.
Figure 7:
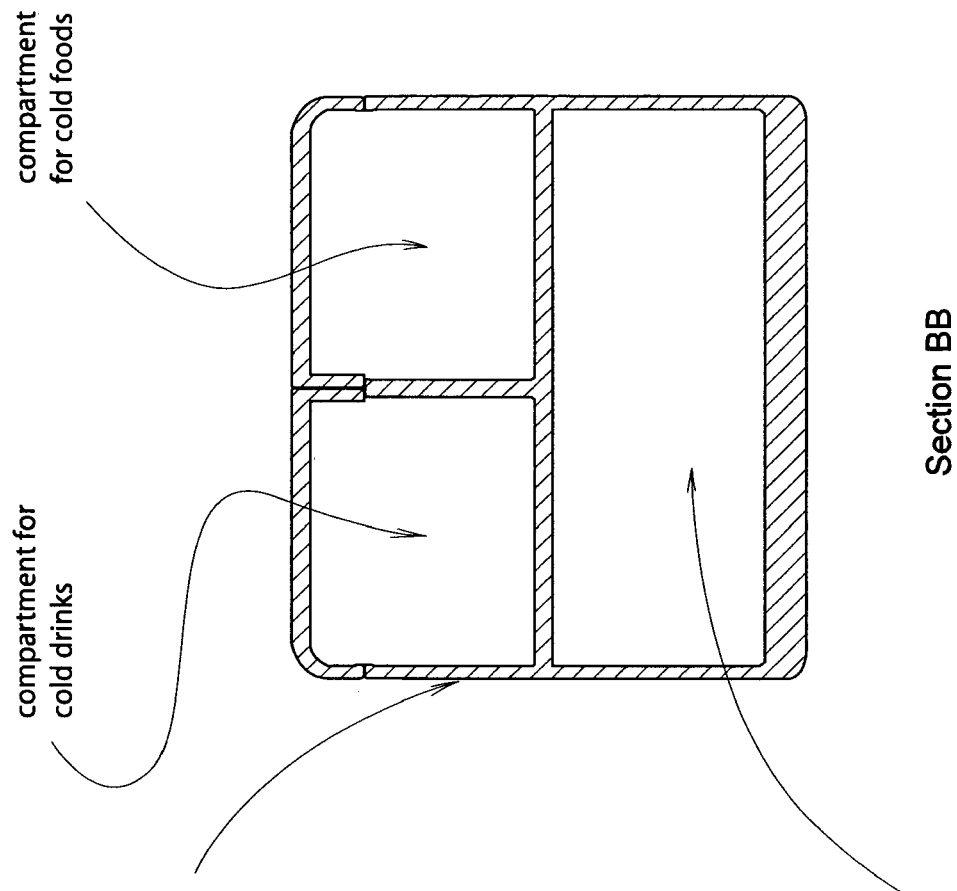
FIG. 7 is a cross sectional view of the cooler taken along line B-B of FIG. 6.
Figure 6:
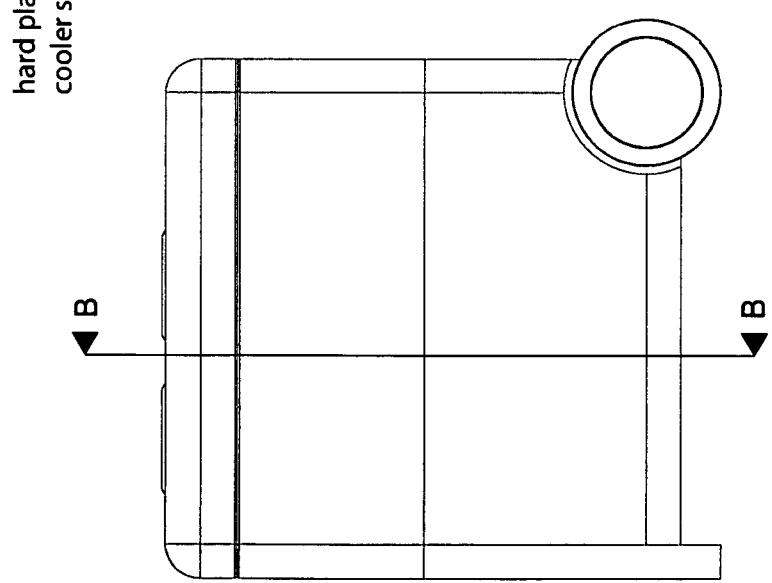
FIG. 6 is a side view of the cooler.
Figure 9:
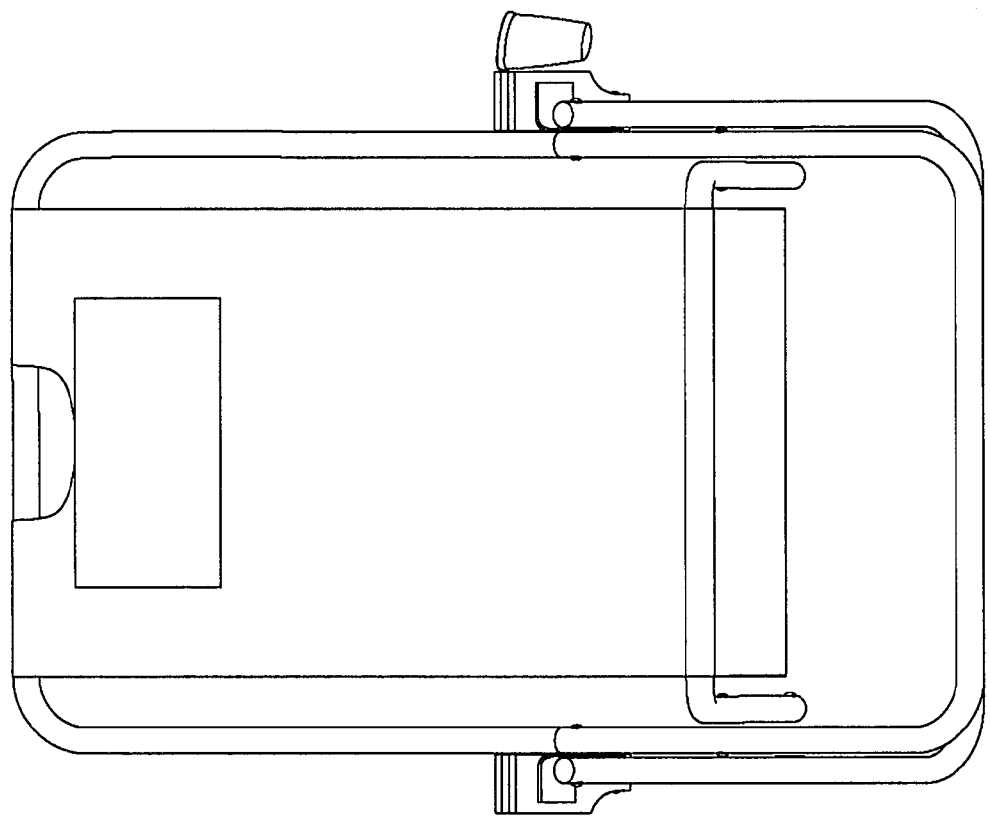
FIG. 9 is a front view of a lounge chair.
Figure 10:
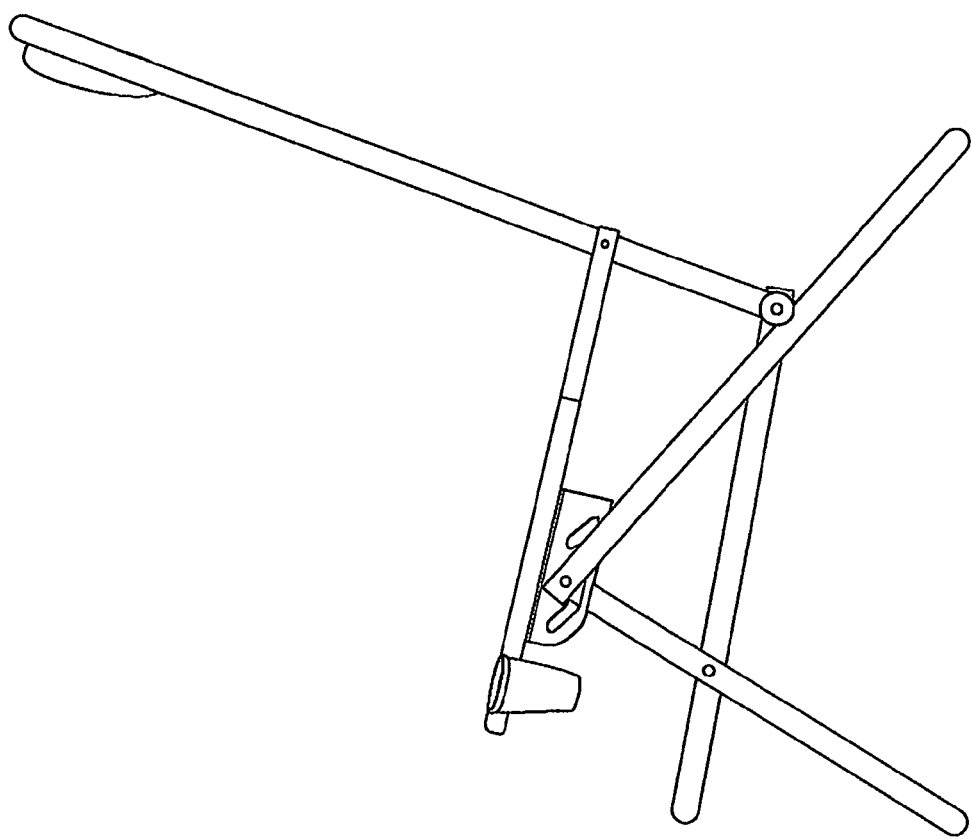
FIG. 10 is a side view of a lounge chair.

All of the major components of the chair frame may be constructed of molded high impact lightweight plastic or other lightweight material. As shown in FIG. 2, the back portion and seat portion of each chair may be constructed of canvas or flexible, resilient mesh or other material that is strong enough to support the weight of a person and would conform to the body contours of a person sitting in the chair. The arm rests, also shown in FIG. 2, may be constructed of lightweight wood or the same lightweight material as the chair frame. FIG. 2, FIG. 9 and FIG. 10 show that each chair also has a cup holder made of canvas or mesh or other flexible material attached to the outside of the armrest farthest away from the cooler.

FIGS. 2 through 7 show that the cooler may be boxlike in shape with rounded edges and corners and consists of a top portion and bottom portion, each portion housing one or more compartments for storage of food and drinks. The cooler may be made of molded lightweight plastic with an insulated core so as to keep foods and drinks warm or cold when stored in the cooler's compartments. The top portion consists of two side-by-side compartments separated by a vertical wall. Each top compartment has a lid that opens upwards, each lid having one or two cup holders molded into the outside surface. One of the top compartments is specifically designed to keep foods cold. For this compartment the lid has part of the inside surface hollowed out and covered on three sides with an elastic mesh so that the pouch formed by the hollowed out space and the mesh may be used to hold an ice pack.

The bottom compartment, designated for the storage of warm foods, may have a lid as shown in FIG, 3. Alternatively the bottom compartment may consist of a pull-out drawer in place of a lid.

Figure 8:
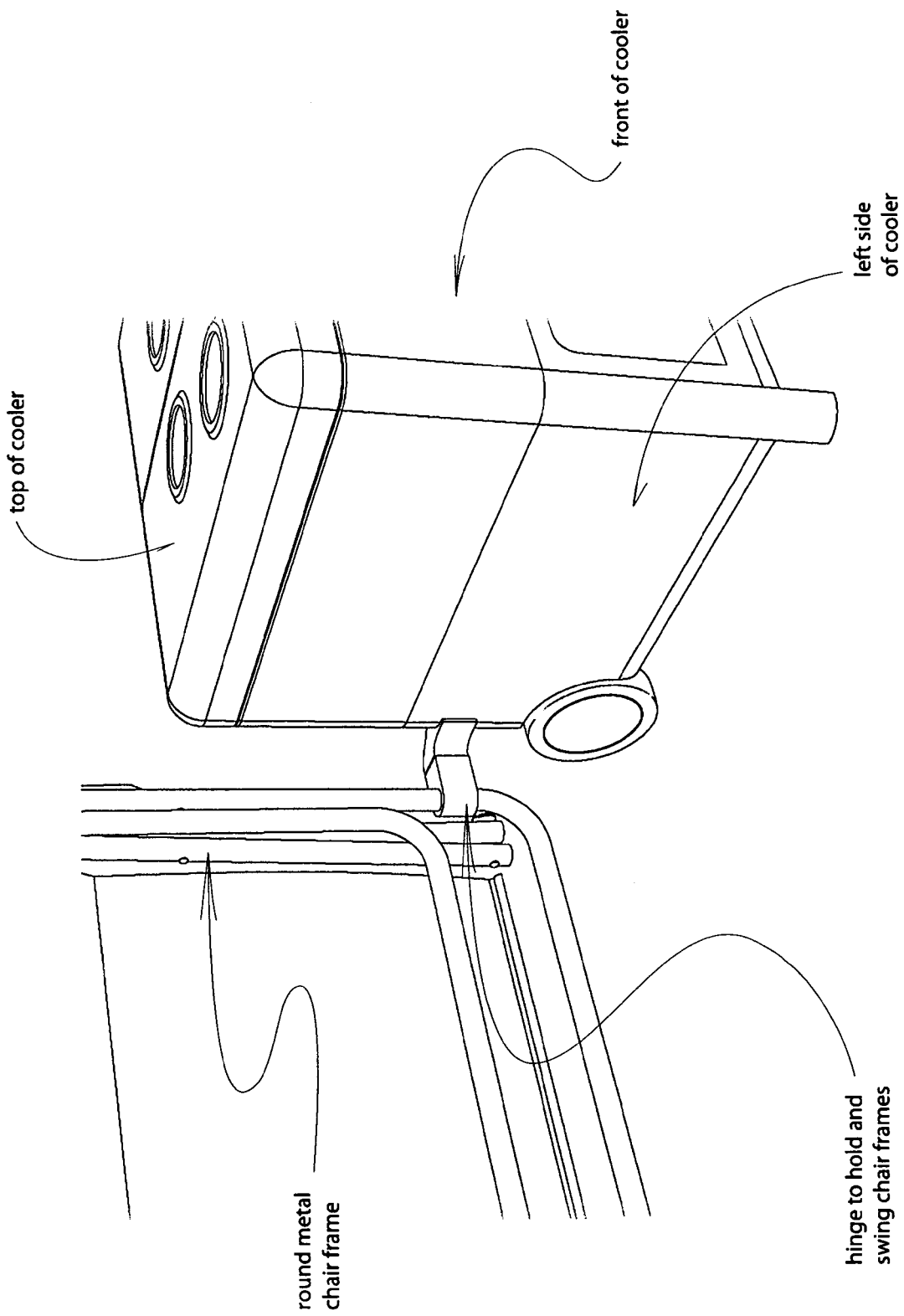
FIG. 8 is a partial perspective view of the connection between lounge chair and cooler.

FIG. 8 shows that the connection between each chair and cooler consists of a hinge with one end attached firmly to one rear corner of the cooler and the other end loosely attached to a chair frame. The hinge allows each chair to be swung in a horizontal direction from its retracted and transportable position in the back of the cooler to one side of the cooler to be unfolded for sitting. The hinge consists of two parts: the first part permanently attached to the cooler and the second part loosely attached one leg frame of the chair. The two parts of the hinge are attached to each other in a way that allows the second part to pivot in a horizontal direction and also in a circular way. The horizontal pivot allows for each chair to be swung from the back of the cooler to the side. The circular pivot allows for the chair legs to be adjusted at various angles to achieve a comfortable sitting position relative to the floor or ground. The connection between each hinge and chair frame must be loose enough to allow for the chair frame to slide up or down in the hinge to allow for adjusting the height of the chair to fit the contours of the floor or ground.

An alternative connection between each chair and cooler consists of a number of snap locks in the back of the cooler to allow for the leg frames of each folded chair to be secured against the cooler in the transportable mode only. When ready for sitting the chair frames may be removed from the snap locks allowing the chairs to be completely disconnected from the cooler.

What we claim as our invention is:

1. A combination of two folding lounge chairs and cooler which comprises:
   a) a storage cooler having four vertical walls to form a front side, rear side, left side and right side, said cooler also having a horizontal bottom and a horizontal top, each of said vertical walls having inner walls and outer walls with heat insulation therein, said horizontal bottom having inner and outer walls with heat insulation therein, said horizontal bottom forming a base for said cooler with two legs supporting the front side and two rolling wheels supporting the rear side, said horizontal top comprising of two hinged side-by-side lids covering two of three separate compartments, each of said lids having inner walls and outer walls with heat insulation therein, each of said lids having two circular indentations, each of said indentations having enough diameter and depth to hold drinking cups,
   b) said first compartment being a top-opening storage compartment and said second compartment being side-by-side to said first compartment and being also top-opening, each of said compartments having a closed bottom, sidewalls, a top and a front, and having inner walls and outer walls and each having heat insulation in-between, said first and second compartments together sitting on top of said third compartment having an open front with a hinged door thereon, said door also having inner walls and outer walls with heat insulation therein,
   c) a first folding lounge chair connected by a hinge to one rear corner of said cooler, a second folding lounge chair connected by a hinge to the opposite corner of said cooler, each said chair being pivotally moveable in a horizontal manner from the back of said cooler to one side of said cooler, each said chair being secured to the back of said cooler by a snap lock that grips a frame of said chair when in a folded position, each said chair being secured to one side of said cooler by a rotatable snap lock that grips a leg frame of said chair when unfolded to one side of said cooler for sitting.

2. The combination of lounge chairs and cooler of claim 1 wherein said cooler further includes said left side and said right side each having a hinge attached to the back edge of said cooler to secure and hold a frame of each said chair of claim 1 against said cooler, said hinge allowing said lounge chair to pivot on one leg frame and swing horizontally from back of said cooler to side of said cooler, said hinge having a toggle joint to allow said chair frame to be held upright when in a folded position, said toggle joint allowing chair frame to be held at various other angles when said chair is unfolded and rotated to the side of said cooler for sitting.

3. The combination of lounge chairs and cooler of claim 1 wherein said cooler further includes said rear side having two snap locks attached to said rear side, one on the right end and one on the left end, each said snap lock to secure and hold a frame of each said chair of claim 1 against rear side of said cooler when in a folded position for transport.

4. The combination of lounge chairs and cooler of claim 1 wherein said cooler further includes said left side and said right side each having a snap lock attached close to the front edge of said side of said cooler to secure and hold a leg frame of said chair of claim 1 against said left side and said right side of said cooler, said snap lock rotatable to allow chair frame to be held at various angles when said chair is expanded and rotated to the side of said cooler for sitting, said snap lock loosely holding said chair frame to allow for sliding of said chair frame up or down to adjust for uneven terrain.

5. The combination of lounge chairs and cooler of claim 1 wherein said cooler further includes said hinged side-by-side top lids that are identical except one lid has a cavity in the wall facing one said top compartment, said cavity being rectangular in shape and being deep enough to hold a small cold pack, said cavity having an elastic mesh hanging loosely on three sides of said cavity so that said mesh and said cavity together form a small pocket for holding a cold pack in place.

6. The combination of lounge chairs and cooler of claim 1 wherein said cooler further includes said third compartment situated at bottom of said cooler having a drawer with four vertical walls to form a front side, rear side, left side and right side, said left side of said drawer having one horizontal groove and said right side of said drawer also having a similar horizontal groove to allow for said drawer to slide easily into said third compartment, said third compartment having a horizontal tongue on the left wall and a horizontal tongue on the right wall, each said horizontal tongue having the right thickness and depth to accommodate each said groove, said drawer having a handle on the front side for pulling said drawer from said third compartment.

7. The combination of lounge chairs and cooler of claim 1 wherein said cooler further includes two legs situated at the bottom of the front edge of said cooler, one on the left side and one on the right side supporting the base of said cooler at the front edge.

8. The combination of lounge chairs and cooler of claim 1 wherein said cooler further includes two rolling wheels situated at the bottom of the rear edge of said cooler, one on the left side and one on the right side supporting the base of said cooler at the rear edge, said wheels allowing for said combination of lounge chairs and cooler to roll horizontally on the ground when pulled.

9. The combination of lounge chairs and cooler of claim 1 wherein each said folding chair is comprised of a frame of lightweight tubular material, each said chair having a back rest and seat made of canvas or other strong, durable and flexible fabric wrapped and secured against said chair frame, said chair frame having hinges and pivot points so that said chair may be folded for storage and unfolded for sitting, said chair frame also having two arm rests, one on the left side of said seat and one on the right side of said seat, each said arm rest having a pouch made of canvas or other durable and flexible fabric attached to the outside edge for use as a drinking cup holder.

10. The combination of lounge chairs and cooler of claim 1 wherein each said folding chair is further comprised of a canvas back rest with a cutout at the top to create a gap between said canvas back rest and top frame of said chair, said gap being large enough for a person's hand to fit through gap and grip said chair frame for ease of pulling said combination of lounge chairs and cooler on the ground when folded for transportation.

11. The combination of lounge chairs and cooler of claim 1 wherein each said folding chair is secured to said cooler when folded for transport but each said chair, when unfolded for sitting, may be completely detached from said cooler, allowing a person using each said chair to locate each said chair in any location independent of the location of said cooler.

* * * * *